Figure 1:
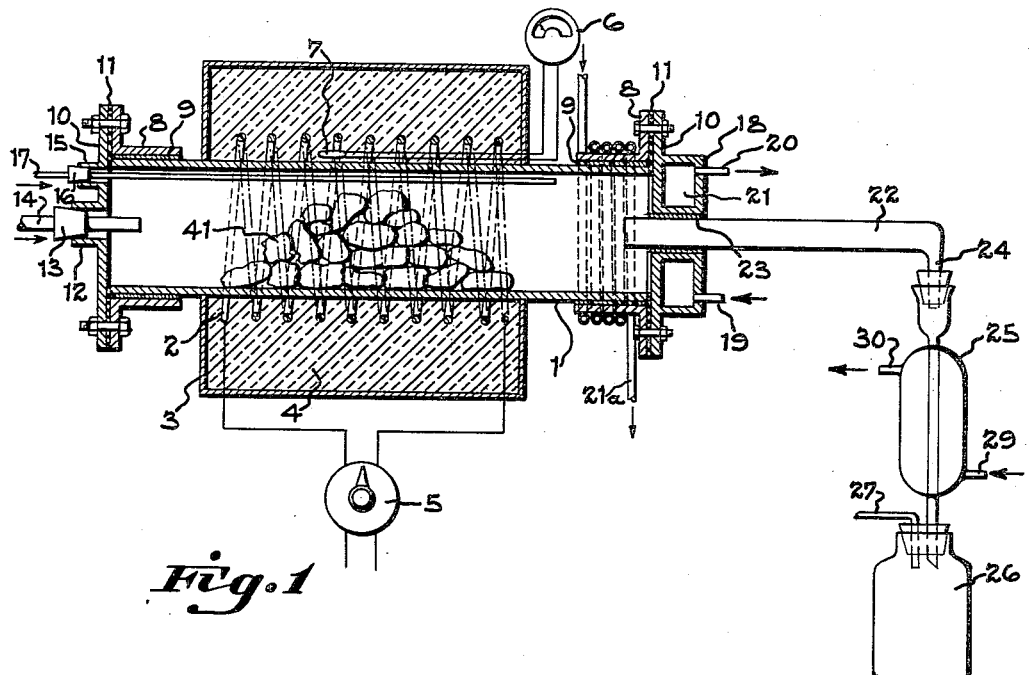

INVENTORS.
Harold R. Harner.
BY Dwight S. Frahin.
Wood, Herron & Evans.
ATTORNEYS.

United States Patent Office 2,767,052
Patented Oct. 16, 1956

2,767,052

RECOVERY OF GERMANIUM FROM SCRAP MATERIALS

Harold R. Harner and Dwight S. Trahin, Joplin, Mo., assignors to The Eagle-Picher Company, Cincinnati, Ohio, a corporation of Ohio Application June 26, 1952, Serial No. 295,734

5 Claims. (Cl. 23—87)

This invention relates to a method of treating scrap materials which contain metallic germanium or germanium compounds, for the purpose of recovering germanium therefrom. The invention is directed particularly to a chloridizing treatment in which metallic germanium contaminated by foreign substances selectively is converted into chloride form which conveniently may be converted to metallic germanium by hydrolysis and reduction or by other suitable methods.

In the manufacture of various types of circuit elements for use in electronic apparatus, such as transistors, diodes, and the like, metallic germanium of a high, controlled degree of purity is utilized. This metal conventionally is produced in the form of billets, which are then cut into pieces of desired size and shape by means of saws. In these operations, at least as much as 50% of the billet metal may be physically reduced to sawdust, broken pieces, billet ends, or the like, all variously contaminated with cutting lubricant, sealing wax (used to hold the billets during cutting), glass, foreign metals, or the like. A typical germanium scrap as produced in the fabrication of transistor elements may consist of approximately 60% by weight of metallic germanium, the balance being foreign substances or impure dioxide, or both. Since the initial cost of metallic germanium is far too great to permit this scrap material to be wasted, the principal objective of the present invention has been to provide a process by which the germanium content of various germaniferous scrap materials may be recovered in a convenient manner at low cost.

A further objective of the invention has been to provide a recovery process in which the yield is high, that is, a method which will enable recovery of substantially all of the germanium content within the scrap. Other objectives of the invention are disclosed in the following description of the invention.

It has previously been known that chlorine gas is capable of reacting with germanium metal at elevated temperature to form germanium tetrachloride, $GeCl_4$; it has also been known that the tetrachloride may be hydrolyzed to yield germanium dioxide, $GeO_2$, which is readily reducible to metal. On a laboratory scale under proper conditions, these reactions are not difficult to achieve. However, in the growing usage of germanium for the production of circuit elements, large quantities of scrap are produced, and efforts to apply the laboratory principles to the recovery of germanium from such materials involve difficult and severe problems which contradict the theoretical feasibility of the technique. Thus, when a substantial quantity of germanium containing scrap material is exposed to chlorine gas at elevated temperature, the reaction either proceeds so slowly, if at all, that the rate of recovery becomes commercially impracticable, or the reaction proceeds with such violence and vigor that the rate of reaction is uncontrollable and the chlorination equipment becomes damaged or destroyed.

We have discovered that these undesirable effects can be eliminated and that germanium can be recovered from scrap material at a satisfactory rate and in commercial quantity with the use of relatively inexpensive apparatus including a source of chlorine gas, a reaction tube or vessel which is capable of being heated wherein the scrap material may be exposed to chlorine at an elevated temperature, and suitable conduit means for carrying away gaseous germanium tetrachloride liberated by the reaction.

When scrap material is heated in a furnace and therein exposed to gaseous chlorine, it is found that a fusion initially occurs wherein a slag is produced which impedes or totally prevents chlorination and which damages the reaction equipment by adhering to reactor surfaces. This slag apparently is produced from glass and various other non-metallic fusible materials which may be present, and it generally acts to prevent otherwise reactable germanium metal or compounds from coming into contact with the chlorine gas.

We have determined that the adverse effects of such fusion may be eliminated by subjecting the scrap material to what may be termed a preliminary treatment, with hydrogen or similar reducing agent at an elevated temperature sufficiently high to reduce any germanium oxides and sufficiently prolonged to enable melting of the germanium particles and coalescence of them, such that upon cooling of the mass, solid billets or chunks of metallic germanium can be readily separated from the contaminating slag. Chunks or billets of germaniferous metal produced by the preliminary treatment react with chlorine far more readily than the untreated scrap even though the latter may be in the state of a powdered charge. Typically, the exposure of the scrap to a hydrogen atmosphere at a temperature of approximately 650° C. for a period of several hours provides satisfactory results. This preliminary treatment, therefore, usefully is employed wherever slag formation impedes subsequent reaction, or where chlorination of the original charge stock is difficult to achieve.

The trouble is that billetized scrap material produced in the manner just described is now so violently reactive with chlorine gas at elevated temperature that the rate of reaction becomes uncontrollable and, peculiarly, a product is liberated in the reaction which condenses on cooler parts of the outlet conduits so much so that they become plugged to prevent desired flow of tetrachloride vapor.

The reaction of metallic germanium with chlorine is an exothermic reaction, and, in the treatment of a substantial quantity of charge stock which is heated initially to a suitable reaction temperature within a furnace, the exothermic heat cannot readily escape so that it exerts the effect of increasing the temperature, which still further increases reaction rate thereby further aggravating the condition. Because of the mass of material undergoing treatment, satisfactory control cannot be achieved by merely stopping the flow of applied heat to the furnace; for example, we found that reaction in a furnace continued for as long as eight hours after all of the applied heat had been shut off. Gaseous germanium tetrachloride is extremely corrosive to ordinary reaction equipment and, of course, its adverse effects become more pronounced as the temperature increases. Therefore, the violence of the reaction makes utilization of a conventional chloridizing process impractical from a maintenance point of view. On the other hand, we found that if the flow of chlorine gas is reduced to an amount which is less than that theoretically required, then, as previously stated, readily condensible fumes are produced in the reaction equipment which freeze and accumulate in the cooler parts of the gas outlet system, thereby plugging the outlet conduit.

From these considerations, it will be observed that if the chloridizing temperature is held at a low point so as to discourage violent reaction, the rate of recovery is too slow; if the temperature is increased with free or excess flow of chlorine, then the reaction rate becomes perilously high, with resultant destruction of gaskets and conduits, and, if the chlorine flow is reduced below the molecular quantity required to support the formation of germanium tetrachloride, then the apparatus becomes plugged with undesired solidified fume.

We have discovered, in substance, that exposure of germanium to gaseous chlorine at elevated temperature not only leads to the production of germanium tetrachloride if the chlorine flow is equal to or exceeds that theoretically required, but that a germanium dichloride, $GeCl_2$, is produced if the chlorine flow is less than that theoretically required to produce the tetrachloride. Germanium dichloride is ordinarily considered a weak compound which becomes disassociated at relatively low temperatures, e. g., 75° C. However, even though the chlorination reaction may be conducted at temperatures of 400–500° C., the dichloride apparently remains undissociated and redeposits in the vapor outlet system.

In accordance with the present invention, the chloridizing process is conducted so as to permit germanium dichloride to be formed, but it is also so conducted that any dichloride permitted to be formed is converted into tetrachloride at a site which is removed from the main reaction site of gaseous chlorine with the scrap material. This may be accomplished in several ways: One method of procedure involves cyclic control; the flow of chlorine gas is started at a predetermined rate capable of satisfying requirements for the formation of germanium tetrachloride with the reactor temperature raised to that of normal operation. As the temperature increases because of the exothermic nature of the reaction, the heat applied to the reactor is cut off. The initial flow rate of chlorine is so adjusted that, at the increased temperature, the flow of chlorine gas is inadequate to supply the quantity demanded for total production of germanium tetrachloride, and as a result, germanium dichloride is formed. Under a deficient chlorine flow, and the heat shut off, the temperature drops in the reactor and the reaction decreases until an excess of chlorine gas is flowing, relative, of course, to the temperature then prevailing. This relative excess of chlorine gas reacts with the previously formed germanium dichloride and converts it to tetrachloride, which vaporizes and passes on through the outlet system. These reactions are illustrated as follows:

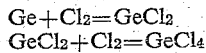

Depending upon the initial chlorine setting, it may be desirable to reduce the chlorine flow rate at the time the temperature increases and thereby provide an additional control which will prevent excessive heating of the charge.

Thus, in the cyclic method of control just described, the flow of chlorine gas sometimes is above the amount theoretically required to form tetrachloride and sometimes below that amount, while the dichloride which is formed under the latter conditions is consumed by the excess of chlorine which is available in the former conditions.

An alternative method of operating the reactor in accordance with the present invention is to control the flow of chlorine to the main reaction site at a point below that theoretically required for the production of germanium tetrachloride, and to provide an auxiliary flow of chlorine beyond the main reaction site in order to supply chlorine gas in quantity sufficient to convert to tetrachloride the dichloride formed under deficient gas flow conditions. In this method of procedure, typically, two chlorine gas streams may be employed, one leading to the charge stock undergoing treatment, the other leading beyond the hot zone of the reactor so as to provide chlorine available for reaction with dichloride formed within the hot zone of the reactor.

In the accompanying drawings, apparatus is illustrated which is adapted to be used in the practice of the invention according to the methods just discussed.

Figure 2:
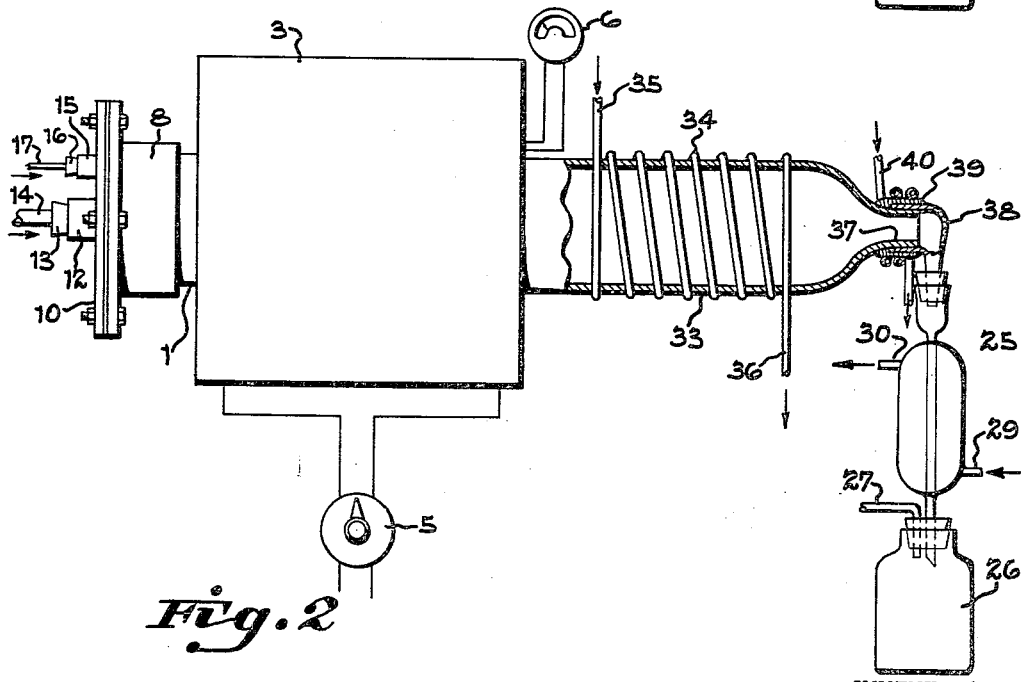

In the drawings:

Figure 1 is a diagrammatic illustration of a reactor and associated equipment for chloridizing germaniferous scrap material and producing germanium tetrachloride therefrom, and Figure 2 is a modified form of reactor, with provisions for cooling the outlet system.

The apparatus shown in Figure 1 consists essentially of a reaction vessel 1, which may be in the form of a fused silica tube. The central portion of this tube is surrounded by a resistance heater element 2, which, in turn, is encased within a housing 3 filled with suitable thermal insulation 4. Resistance heater 2 is in circuit connection with an auto transformer 5 or other suitable device for controlling the temperature, and an indicator 6, connected to a thermocouple 7, is provided for temperature indication.

Each end of the reactor tube 1 is equipped with a flange 8 fastened to the tube by means of non-porous, chemically resistant cement 9. End plates 10, 10 cooperate with the flanges 8, 8 at the respective ends of the reactor tube, the end plates being gasketed to provide gas-tight seals as at 11. Bolts pass through the flange, end plate and gasket assemblies in order to hold the end plates in place. By virtue of the corrosive nature of both chlorine and germanium chlorides, and by virtue of the high temperature prevailing at the discharge end of the reactor hot zone, the gasketing material is exposed to adverse conditions, but we have found that resinous tetrafluoroethylene sheet material, sold by E. I. DuPont deNemours & Company under the trade name Teflon, is generally satisfactory for the purpose under the control conditions provided by the methods of the present invention.

At the head end of the apparatus, end plate 10 is provided with a chlorine inlet thimble 12 which receives a stopper 13 traversed by chlorine inlet tube 14. A supplemental chlorine inlet thimble 15, provided with a stopper 16, carries a supplemental chlorine inlet tube 17 at the head end plate. Its use is described at a later point.

At the discharge end of the apparatus, the end plate 10 carries a cooling jacket 18 having a coolant inlet nipple 19 and a coolant outlet nipple 20. Cooling water or other suitable coolant passes through the annular cavity 21 within the jacket and thereby helps maintain end plate 10 at a temperature below that which the gasket would be adversely affected. For similar purpose, the reactor tube 1 is surrounded by a cooling coil 21a inwardly adjacent the flange 8.

A discharge tube 22 extends through the discharge end plate 10 and water jacket 18 thereof to the interior of the reactor tube 1. This tube may be made of fused silica or Vycor and acts as an air condenser. The tube is cemented in place at the reactor by chemically resistant cement 23, and terminates in a spout 24 which is connected to a water cooled condenser 25. The condenser discharges into a receiver 26 which is provided with a vent 27 to permit the escape of non-condensible gases. The cooling water inlet and outlet to condenser 25 are designated 29 and 30 respectively.

The reactor shown in Figure 2 is generally similar to that shown in Figure 1 as to the construction of the heating means, head end seal, chlorine inlet and the like, but the reactor tube 1 has a portion 33 which extends well beyond the heater housing at the discharge side. This extended portion may be of the same general diameter as that of the tube in the reaction or hot zone, and the extended portion constitutes a condenser which is cooled by means of a coil 34 through which coolant is passed from the inlet 35 to the outlet 36. The discharge end of the condenser portion 33 of the reactor tube is of reduced diameter, as at 37, for reception within a condenser adaptor 38. The connection between these two members is flexibly sealed by a section of suitable tubing 39 such as Buna N rubber, which is also cooled by means of a tube coil 40 extending around the joint. Condenser adaptor 38 discharges into a water cooled condenser, thence to a receiver, in the manner described in connection with Figure 1.

In the utilization of the apparatus shown in Figure 1 according to the cyclic method previously described, a charge of the germaniferous material which is to be chloridized is introduced into the reactor tube as at 41. This may be accomplished by removal of the head end plate. The apparatus is heated to suitable temperature by the heater 2, and a stream of chlorine is admitted through the inlet 14. The rate at which chlorine is admitted to the reactor is adjusted so as to be substantially equal to or slightly greater than the chlorine demand for converting germanium to germanium tetrachloride at or below the operating temperature then prevailing.

The chlorine, on coming into contact with the germaniferous material, reacts to produce germanium tetrachloride vapor which passes through the air condenser 22 and water condenser 25 into the receiver 26. However, liberation of tetrachloride vapor is accompanied by liberation of heat; hence, the temperature of the reactor increases above that provided or maintained by the resistance heater 2. Under the higher temperature conditions, the prevailing rate of chlorine flow is inadequate to satisfy the chlorine demand, and germanium dichloride is formed in consequence. At this time, the line voltage may be decreased by adjustment of controller 5 and the temperature begins to fall. As the rate of reaction decreases, so does the chlorine demand until it is satisfied and an excess of chlorine is flowing. To accomplish this result, the flow of chlorine may be adjusted as well as the temperature controller 5.

The germanium dichloride formed during the period of time that the chlorine flow is inadequate relative to demand, condenses and collects in the air cooled condenser 22, as well as in the water cooled portion of the reactor tube, but, when an excess of chlorine again is available, this collected dichloride readily reacts with additional chlorine. The system thereby periodically becomes purged of dichloride formations.

A similar technique for converting dichloride may be utilized in the operation of the apparatus shown in Figure 2, wherein the dichloride will collect principally in the portion of the reactor tube which is surrounded by the cooling coil 34.

Supplemental chlorine supply tube 17 is utilized in the apparatus of either Figure 1 or 2 in the event it is desired to maintain temperature and chlorine flow in a steady state. In this event, the primary supply of chlorine, as through inlet tube 14, is so adjusted that the supply of chlorine reaching the charge of germaniferous material in the reactor tube is inadequate to satisfy the requirements for production of tetrachloride only. Undesirable increase of temperature through exothermic reaction thereby is minimized, but germanium dichloride is formed. The dichloride vapors condense and collect on the cooler parts of the reaction tube, but are then converted into vaporous tetrachloride by admission of chlorine through the supplemental tube 17. Thus, chlorine is admitted at a point downstream from the charge of material being treated. All tetrachloride vapors then pass through the water cooled condenser 25 and are caught as liquid in receiver 26.

The temperature, or general temperature range, at which reaction is conducted in the hot zone of the reactor need, in general, be only sufficiently high to promote chlorine acceptance, and, of course, should not be allowed to reach the point where the reaction equipment would become damaged. Chlorine does not react with germanium metal at room temperatures, although the reaction of chlorine with germanium dichloride will proceed at that level. We have obtained satisfactory results by maintaining temperatures of between 300–500° C. at the hot zone of the reactor and exercise control over the heater input or the chlorine flow, or both, to prevent excessive temperature rise through liberation of exothermic heat. The control, of course, needs to be exercised with greater care, the higher the initial temperature.

Typical examples illustrating utilization of the invention are disclosed as follows:

*Example 1.—Conversion of saw cuttings or "sludge" to crude chunk germanium metal by preliminary treatment*

We charged 930.0 grams of dried sludge analyzing 74.47% germanium into fused silica boats and placed them in the heated zone of a fused silica tube held in a controlled temperature gas fired furnace. The tube ends were sealed and a flow of hydrogen started through the tube. After the air was swept out the temperature was raised to 650° C. and maintained until no more water was evolved. The temperature was then raised to 1050° C., maintained for 30 minutes and the heat shut off. The tube temperature was allowed to drop to 200° C. still with hydrogen flowing. The hydrogen was shut off, and the boat removed. The products were a crude billet of germanium weighing 684.6 grams and 168.4 grams of slaggy material.

*Example 2.—Chloridizing of crude germanium metal*

6522 grams of crude germanium metal were charged into a furnace of the type shown in Figure 1. Chlorine flow was introduced and heat turned on. The reaction began at 300° C. $GeCl_4$ began dripping from the condenser at 350° C., and at 400° C. the reaction was quite vigorous. The heat was then shut off and the chlorine flow reduced so that there was slow decrease in hot zone temperature. $GeCl_2$ deposited in air condenser 22 at peak temperature. As hot zone temperature dropped to 300° C., reaction of chlorine with metal decreased until there was excess chlorine. This combined with the $GeCl_2$ producing $GeCl_4$ which vaporized and passed on to the condenser and receiver. When the air condenser was cleaned of deposited $GeCl_2$ the heat was turned on again and the cycle repeated. Three cycles were required to complete the chloridizing of the metal charge. The product comprised 10,080 cc. of liquid $GeCl_4$ containing 6180 grams of germanium and 27.3 grams of powdery residue in the reactor.

*Example 3*

6780 grams of crude germanium metal was charged into a reactor as exemplified in Figure 2. Chlorine flow was started in the primary or upstream inlet and heat turned on. At 400° C. the reaction was vigorous and the heat was cut off. Secondary or downstream chlorine flow from inlet 17 was started to react with the $GeCl_2$ being formed. The primary chlorine flow was adjusted so there was slight excess of exothermic heat of reaction and the temperature slowly rose, reaching a peak at 580° C., after which it slowly decreased because by this time most of the germanium metal had been consumed. During this period the secondary chlorine was kept so adjusted as to react with all $GeCl_2$ formed and to leave a small excess of chlorine which continuously escaped through the vent tube 27. When the reaction zone temperature had dropped to 400° C., the heat was again turned on to maintain that temperature while completing the run. After eight hours of operation, secondary chlorine was no longer needed, the reaction having slowed down to the point where excess chlorine could be provided from the primary inlet so as to react with all $GeCl_2$ produced and provide a small amount of free chlorine to sweep the system and escape through the vent tube. After eleven additional hours of operation, no more $GeCl_4$ was visibly dripping from the condenser so heat and chlorine were shut off and the apparatus allowed to cool. The reactor was flushed with air to exhaust residual chlorine. The receiver contained 10,930 ccs. of liquid germanium tetrachloride with a germanium content of 6705 grams. 3.2 grams of powdery residue also was produced. The chlorine efficiency was 95.1%.

*Example 4*

There were 904 grams of scrap germanium dioxide reduced to metal by methods set forth in Example 1. 604.3 grams of impure metal resulted. After several batch reductions, the products were combined to provide a 6,502 gram charge to the chloridizing furnace. This charge was then treated as in Example 3 and produced 10,200 ccs. of liquid germanium tetrachloride with a germanium content of 6,250 grams. 66.5 grams of residue were left in the reactor.

While the invention has been disclosed particularly in relation to the recovery of metallic germanium from metal scrap and the like, it is also useful for the recovery of germanium from various chloridizable sludges and wastes such as produced in metallurgical recovery operations, and is also applicable to germanium concentrates produced by leaching; the term "germaniferous scrap" is therefore employed in the claims which follow to designates these various types of materials.

Having described our invention, we claim:

1. The method of producing germanium tetrachloride from germaniferous scrap, which method comprises, subjecting the scrap, at elevated temperature, to reduction by contacting it with hydrogen gas, subsequently exposing the reduced scrap to chlorine gas at elevated temperature while limiting the amount of chlorine gas, to form, coincidentally, a reaction product consisting of part germanium tetrachloride and part germanium dichloride, conducting the reaction product from the site of the reaction, condensing the germanium dichloride component thereof, and separately contacting the condensed germanium dichloride with chlorine gas to convert the same to germanium tetrachloride.

2. The method of treating germaniferous scrap to convert germanium thereof to germanium tetrachloride, which method comprises, subjecting the said scrap at elevated temperature to chlorine gas which is sufficient in amount to produce germanium dichloride but insufficient in amount to convert all of the scrap to germanium tetrachloride, condensing germanium dichloride formed in said reaction, and separately converting condensed germanium dichloride to germanium tetrachloride by contacting it with chlorine gas.

3. The method of producing germanium tetrachloride from germaniferous scrap, which method comprises, bringing the scrap material at an elevated temperature into reaction contact with chlorine gas in quantity proportioned to produce vaporous germanium tetrachloride and germanium dichloride, condensing the said germanium dichloride at a point beyond the site of the reaction, and separately contacting condensed germanium dichloride with chlorine gas to convert the same to vaporous germanium tetrachloride, and collecting the germanium tetrachloride formed in both of said reactions.

4. The method of chloridizing germaniferous scrap which method comprises, initially heating the said scrap to a temperature above the melting point of metallic germanium while maintaining the said scrap in a reducing atmosphere, thereby forming a pool of metallic germanium and a slag of non-metallic fusion products, separating the metallic germanium from the slag, subsequently contacting the metallic germanium with chlorine gas at an elevated temperature in quantity proportioned to provide a reaction product containing vaporous germanium tetrachloride and germanium dichloride, conducting the vapors of germanium tetrachloride and dichloride from the site of reaction, and subjecting the vapors to a temperature which is insufficient to condense germanium tetrachloride but sufficient to condense germanium dichloride, exposing the condensed germanium dichloride to chlorine gas to convert the same to germanium tetrachloride, and collecting the germanium tetrachloride initially liberated and the germanium tetrachloride formed by reaction of chlorine gas with the condensed germanium dichloride.

5. The method of chloridizing germanium scrap, which method comprises, contacting germanium scrap at elevated temperature with chlorine gas in proportion controlled to produce germanium tetrachloride and germanium dichloride vapors, conducting the vapors from the reaction site and subjecting them to a lower temperature which is insufficient to condense germanium tetrachloride but sufficient to condense germanium dichloride, subjecting the condensed germanium dichloride to chlorine gas and thereby converting it to germanium tetrachloride, and collecting germanium tetrachloride which is formed in both reactions.

References Cited in the file of this patent

UNITED STATES PATENTS

| Number | Name | Date |
|---|---|---|
| 920,391 | Reid | May 4, 1909 |
| 1,352,912 | Partridge | Sept. 14, 1920 |
| 1,482,306 | Kirst | Jan. 29, 1924 |
| 1,814,392 | Low et al. | July 14, 1931 |
| 2,020,431 | Osborne et al. | Nov. 12, 1935 |
| 2,378,675 | Agnew et al. | June 19, 1945 |
| 2,510,932 | Poland | June 6, 1950 |
| 2,594,370 | Warburton | Apr. 29, 1952 |